United States Patent
Radhakrishnan et al.

(10) Patent No.: US 9,032,692 B2
(45) Date of Patent: May 19, 2015

(54) POLYURETHANE BASED INSULATED GLASS SEALANT

(75) Inventors: Bindushree Radhakrishnan, Lake Jackson, TX (US); Laura A. Grier, Brazoria, TX (US); Syed Z. Mahdi, Rochester Hills, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/878,380

(22) PCT Filed: Nov. 10, 2011

(86) PCT No.: PCT/US2011/060210
§ 371 (c)(1),
(2), (4) Date: Apr. 8, 2013

(87) PCT Pub. No.: WO2012/064971
PCT Pub. Date: May 18, 2012

(65) Prior Publication Data
US 2013/0216840 A1    Aug. 22, 2013

Related U.S. Application Data

(60) Provisional application No. 61/412,525, filed on Nov. 11, 2010.

(51) Int. Cl.
| | | |
|---|---|---|
| *E04B 1/66* | (2006.01) | |
| *E04C 2/54* | (2006.01) | |
| *E06B 3/00* | (2006.01) | |
| *B32B 37/12* | (2006.01) | |
| *C09J 175/04* | (2006.01) | |
| *C03C 27/10* | (2006.01) | |
| *C08G 18/28* | (2006.01) | |
| *C08G 18/36* | (2006.01) | |
| *C08G 18/77* | (2006.01) | |
| *C08G 18/78* | (2006.01) | |
| *C08G 18/79* | (2006.01) | |

(52) U.S. Cl.
CPC . *E04B 1/66* (2013.01); *B32B 37/12* (2013.01); *C03C 27/10* (2013.01); *C08G 18/289* (2013.01); *C08G 18/36* (2013.01); *C08G 18/778* (2013.01); *C08G 18/7831* (2013.01); *C08G 18/797* (2013.01); *C08G 2190/00* (2013.01); *C09J 175/04* (2013.01)

(58) Field of Classification Search
USPC ......... 52/786.1; 428/423.1, 425.6; 156/331.4, 156/331.7; 528/44, 67
See application file for complete search history.

(56) References Cited

U.S. PATENT DOCUMENTS

| | | | | |
|---|---|---|---|---|
| 4,318,959 | A * | 3/1982 | Evans et al. | 428/364 |
| 4,625,012 | A | 11/1986 | Rizk et al. | |
| 5,623,044 | A | 4/1997 | Chiao | |
| 5,852,137 | A | 12/1998 | Hsieh et al. | |
| 6,001,214 | A | 12/1999 | Hsieh et al. | |
| 7,345,130 | B2 | 3/2008 | Zhu et al. | |
| 7,417,105 | B2 | 8/2008 | Landon et al. | |
| 7,541,076 | B2 * | 6/2009 | Landon | 428/34 |
| 7,691,479 | B2 * | 4/2010 | Schmatloch et al. | 428/423.1 |
| 2005/0032974 | A1 | 2/2005 | Krebs et al. | |
| 2006/0084723 | A1 * | 4/2006 | Hartwig et al. | 523/212 |
| 2007/0116907 | A1 | 5/2007 | Landon et al. | |

FOREIGN PATENT DOCUMENTS

WO   WO 2010009256 A1 * 1/2010

OTHER PUBLICATIONS

PCT/US2011/060210, International Search Report and Written Opinion.
PCT/US2011/060210, International Preliminary Report on Patentability.

* cited by examiner

*Primary Examiner* — Thao T. Tran

(57) ABSTRACT

Embodiments of the invention include insulated units and methods of producing the insulating units. The insulating units include a first surface, a structural seal disposed on at least portions of the first surface, and a second surface disposed on the structural seal. The structural seal includes the reaction product of at least one first isocyanate, at least one isocyanate reactive side, and at least one adhesion promoter including a reaction product of at least one secondary aminoalkoxy silane and at least one second isocyanate.

20 Claims, No Drawings

US 9,032,692 B2

POLYURETHANE BASED INSULATED GLASS SEALANT

FIELD OF THE INVENTION

Embodiments of the invention relate insulated units, more specifically to insulated units having polyurethane based seals.

BACKGROUND OF THE INVENTION

Insulating (or insulated) glass (IG) units comprise two parallel sheets of glass held apart by spacer bars. The cavity formed between the sheets of glass is filled with inert gas to help reduce heat and sound transmission. Typically two different types of sealants are used to join the glass to the spacer bars. The innermost or the primary sealant joins the space bars to the glass sheets, and serves as a barrier against escape or egress of the inert gas from the cavity as well as a barrier against the entry or ingress of moisture vapor into the cavity. Thermoplastic polyisobutylene is one common primary sealant. However this material lacks mechanical strength and it exhibits comparably less adhesion than the outermost or secondary sealant. As such, one function of the secondary sealant is to provide mechanical strength to the unit and to prevent rupture of the primary sealant during the natural thermal cycles to which the unit is exposed.

Because of its good mechanical properties, polyurethane, particularly polyurethane that is based on a hydrophobic polybutadiene-based polyol, is a commonly used secondary sealant. However, such polyurethanes may not have optimal glass adhesion characteristics under extreme environmental conditions. Therefore, there is a need for polyurethane based sealants that have enhanced glass adhesion characteristics.

SUMMARY OF THE INVENTION

Embodiments of the invention relate to polyurethane based sealants that have enhanced glass adhesion characteristics.

Embodiments encompass methods of producing an insulated unit. The methods include forming at least one isocyanate reactive side, which includes at least one hydrophobic polyol having an average functionality from about 2 to about 6, at least one chain extender having two isocyanate-reactive groups per molecule and an equivalent weight per isocyanate-reactive group of less than 400, at least one filler, (such as barium sulfate ($BaSO_4$), aluminum oxide ($Al_2O_3$), aluminum hydroxide ($Al(OH)_3$), magnesium hydroxide ($Mg(OH)_2$) calcium carbonate ($CaCO_3$), mica, and talc). The at least one isocyanate reactive side is contacted with at least one first isocyanate in a presence of at least one adhesion promoter. The at least one adhesion promoter includes at least the reaction product of at least one secondary aminoalkoxy silane and at least one second isocyanate, the reaction product having an average of at least one silane group and at least one isocyanate group per molecule. The contacted at least one isocyanate reactive side, at least one first isocyanate, and the at least one adhesion promoter is applied between at least portions of a first surface and a second surface.

Embodiments encompass insulated units, which include a first surface, a structural seal disposed on at least portions of the first surface, and a second surface disposed on the structural seal. The structural seal comprises the reaction product of at least one first isocyanate, at least one isocyanate reactive side, and at least one adhesion promoter. The at least one isocyanate reactive side includes at least one hydrophobic polyol having an average functionality from about 2 to about 6, at least one chain extender having two isocyanate-reactive groups per molecule and an equivalent weight per isocyanate-reactive group of less than 400, and at least one filler (such as barium sulfate ($BaSO_4$), aluminum oxide ($Al_2O_3$), aluminum hydroxide ($Al(OH)_3$), magnesium hydroxide ($Mg(OH)_2$) calcium carbonate ($CaCO_3$), mica, and talc). The at least one adhesion promoter includes at least the reaction product of at least one secondary aminoalkoxy silane and at least one second isocyanate, the reaction product having an average of at least one silane group and at least one isocyanate group per molecule.

DESCRIPTION OF EMBODIMENTS OF THE INVENTION

Embodiments of the invention provide for methods producing sealants that have enhanced glass adhesion characteristics while at the same time maintain its physical, structural, and mechanical properties. Embodiments of the sealants encompass two-component polyurethane systems where a first component includes at least one polyol and is reacted with a second component which includes at least one polyisocyanate. The first component and the second component and are mixed immediately before application, and applied to a base material to be cured.

The first component (also called an isocyanate reactive side) includes at least one hydrophobic polyol having an average functionality from about 2 to about 6 Between about 10 and about 55 weight % of the first component may include the at least one polyol. All individual values and subranges between about 10 and about 55 weight % are included herein and disclosed herein; for example, the amount can be from a lower limit of about 10, 15, 20, 25, 30, 35, 40, or 45 weight % to an upper limit of about 20, 25, 30, 35, 40, 45, 50, or 55 weight %.

Suitable polyols may include at least one hydrophobic polyol such as a diol of a conjugated diolefin monomer, a polyisobutylene diol, a polyester polyol prepared from fatty diols and/or fatty diacids, or mixtures thereof. For instance, the hydrophobic polyol can be prepared from dimer fatty alcohols and/or dimer fatty acids. The diols of conjugated olefin monomers that can be used include hydrogenated polybutadienediols, and hydrogenated polyisoprene diol. Hydrogenated polybutadiene polyols are sold by Mitsubishi Chemical Corporation under the trade name POLYTAIL and Kraton polyols sold by Kraton Polymers of Houston, Tex.

Dimeric acid polyester polyols containing from about 18 to about 44 carbon atoms are may also be used. Dimer acids (and esters thereof) are a well known commercially available class of dicarboxylic acids (or esters). They are normally prepared by dimerising unsaturated long chain aliphatic monocarboxylic acids, usually of 13 to 22 carbon atoms, or their esters (alkyl esters). The dimerisation is thought (although we should not be bound by this theory) to proceed by possible mechanisms which includes Diels Alder, free radical, and carbonium ion mechanisms. The dimer acid material will usually contain 26 to 44 carbon atoms. Particularly, examples include dimer acids (or esters) derived from $C_{18}$ and $C_{22}$ unsaturated monocarboxylic acids (or esters) which will yield, respectively, $C_{36}$ and $C_{44}$ dimer acids (or esters). Dimer acids derived from $C_{18}$ unsaturated acids, which include acids such as linoleic and linolenic are particularly well known (yielding $C_{36}$ dimer acids). For example, DELTA 9, 11 and DELTA 9, 12 linoleic acids can dimerise to a cyclic unsaturated structure (although this is only one possible structure; other structures, including acyclic structures are also possible). The dimer acid products may also contain a proportion of trimer acids ($C_{54}$ acids when using $C_{18}$ starting acids), possibly even higher oligomers and also small amounts of the monomer acids. Several different grades of dimer acids are available from commercial sources and these differ from each other primarily in the amount of monobasic and trimer acid fractions and the degree of unsaturation. PRIPLAST polyester polyols are branched $C_{36}$ dimerized fatty acids which are particularly useful as the hydrophobic polyol in the practice of this invention. PRIPLAST polyester polyols are commercially available from Uniqema of Gouda, Netherlands. The hydrophobic may have a number average molecular weight which is within the range of about 1,500 to about 4,000 or in the range of about 2,000 to about 3,000.

Suitable polyols also encompass natural oil-based polyols (NOBP). NOBP are polyols based on or derived from renewable feedstock resources such as natural and/or genetically modified plant vegetable seed oils and/or animal source fats. Such oils and/or fats are generally comprised of triglycerides, that is, fatty acids linked together with glycerol. Preferred are vegetable oils that have at least about 70 percent unsaturated fatty acids in the triglyceride. Preferably the natural product contains at least 85 percent by weight unsaturated fatty acids. Examples of preferred vegetable oils include, but are not limited to, those from castor, soybean, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or a combination of two or more of these oils. Examples of animal products include lard, beef tallow, fish oils and mixtures of two or more of these products. Additionally, oils obtained from organisms such as algae may also be used. Combination of vegetable, algae, and animal based oils/fats may also be used.

The modified natural oil derived polyols may be obtained by a multistep process in which the animal or vegetable oils/fats are subjected to transesterification and the constituent fatty acids recovered. This step is followed by hydroformylating carbon-carbon double bonds in the constituent fatty acids to form hydroxymethyl groups. Suitable hydroformylation methods are described in U.S. Pat. Nos. 4,731,486 and 4,633,021, for example, and in U.S. Published Patent Application 2006/0193802. The hydroxymethylated fatty acids are "monomers" which form one of the building blocks for the natural oil based polyol. The monomers may be a single kind of hydroxymethylated fatty acid and/or hydroxymethylated fatty acid methyl ester, such as hydroxymethylated oleic acid or methylester thereof, hydroxymethylated linoleic acid or methylester thereof, hydroxymethylated linolenic acid or methylester thereof, α- and (-linolenic acid or methyl ester thereof, myristoleic acid or methyl ester thereof, palmitoleic acid or methyl ester thereof, oleic acid or methyl ester thereof, vaccenic acid or methyl ester thereof, petroselinic acid or methyl ester thereof, gadoleic acid or methyl ester thereof, erucic acid or methyl ester thereof, nervonic acid or methyl ester thereof, stearidonic acid or methyl ester thereof, arachidonic acid or methyl ester thereof, timnodonic acid or methyl ester thereof, clupanodonic acid or methyl ester thereof, cervonic acid or methyl ester thereof, or hydroxymethylated ricinoleic acid or methylester thereof. In one embodiment the monomer is hydroformylated methyloelate. Alternatively, the monomer may be the product of hydroformylating the mixture of fatty acids recovered from transesterification process of the animal or vegetable oils/fats. In one embodiment the monomer is hydrogenated soy bean fatty acids. In another embodiment the monomer is hydrogenated castor bean fatty acids. In another embodiment the monomer may be a mixture of selected hydroxymethylated fatty acids or methylesters thereof.

In one embodiment the NOBP is monol-rich monomer NOBP. "Monol-rich monomer" and like terms means a composition comprising at least 50, typically at least 75 and more typically at least 85, weight percent (wt %) mono-hydroxy functional fatty acid alkyl ester such as, but not limited to, that of formula I:

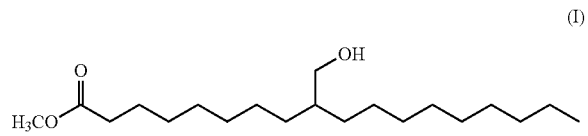

The length of the carbon backbone of formula I can vary, e.g., $C_{12}$-$C_{20}$, but it is typically $C_{18}$, as can the placement of the hydroxymethyl group along its length. The monol-rich monomer used in the practice of this invention can comprise a mixture of mono-hydroxy functional fatty acid alkyl esters varying in both carbon backbone length and hydroxy group placement along the length of the various carbon backbones. The monomer can also be an alkyl ester other than methyl, e.g., a $C_2$-$C_8$ alkyl ester. Other components of the composition include, but are not limited to, poly (e.g., di-, tri-, tetra-, etc.) hydroxy functional fatty acid alkyl esters.

The source of the monol-rich monomer can vary widely and includes, but is not limited to, high oleic feedstock or distillation of a low oleic feedstock, e.g., a natural seed oil such as soy as, for example, disclosed in co-pending application "PURIFICATION OF HYDROFORMYLATED AND HYDROGENATED FATTY ALKYL ESTER COMPOSITIONS" by George Frycek, Shawn Feist, Zenon Lysenko, Bruce Pynnonen and Tim Frank, filed Jun. 20, 2008, application number PCT/US08/67585, published as WO 2009/009271. The use of NOBP made using a monomer not rich in mono-hydroxy functional fatty acid alkyl esters results in a highly crosslinked system that can lead to loss in mechanical properties. Sealant compositions require polymers with high elongation, and thus the preference for monol-rich monomer NOBP. Mono-functional monomers, such as those of formula (I), are used to synthesize the polyol.

The monol-rich monomer NOBP may be derived by first hydroformylating and hydrogenating the fatty alkyl esters or acids, followed by purification to obtain monol rich monomer. Alternatively, the fatty alkyl esters or acids may first be purified to obtain mono-unsaturated rich monomer and then hydroformylated and hydrogenated.

In one embodiment the NOBP is made from a monomer derived using epoxidation and ring opening of the natural oil fatty acids or methyl ester fatty acids, as described in WO 2009/058367 and WO 2009/058368.

The polyol is formed by reaction of the monomer with an appropriate initiator compound to form a polyester or polyether/polyester polyol. Such a multistep process is commonly known in the art, and is described, for example, in PCT publication Nos. WO 2004/096882 and 2004/096883. The multistep process can result in the production of a polyol with both hydrophobic and hydrophilic moieties, which results in enhanced miscibility with both water and conventional petroleum-based polyols.

The initiator for use in the multistep process for the production of the natural oil derived polyols may be any initiator used in the production of conventional petroleum-based polyols. Preferably the initiator is selected from the group consisting of neopentylglycol; 1,2-propylene glycol; trimethylolpropane; pentaerythritol; sorbitol; sucrose; glycerol; aminoalcohols such as ethanolamine, diethanolamine, and triethanolamine; alkanediols such as 1,6-hexanediol, 1,4-butanediol; 1,4-cyclohexane diol; 1,3-cyclohexanedimethanol, 1,4-cyclohexanedimethanol, 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis(hydroxy-methyl)tricyclo[5,2,1,0$^{2,6}$]decene; Dimerol alcohol (36 carbon diol available from Henkel Corporation); hydrogenated bisphenol; 9,9(10,10)-bishydroxymethyloctadecanol; 1,2,6-hexanetriol and combination thereof. Preferably the initiator is selected from the group consisting of glycerol; ethylene glycol; 1,2-propylene glycol; trimethylolpropane; ethylene diamine; pentaerythritol; 1,4-cyclohexanedimethanol, diethylene triamine; sorbitol; sucrose; or any of the aforementioned in which at least one of the alcohol or amine groups present has been reacted with ethylene oxide, propylene oxide or mixture thereof; and combinations thereof. Preferably, the initiator is glycerol, trimethylolpropane, pentaerythritol, 1,4-cyclohexanedimethanol, sucrose, sorbitol, and/or mixture thereof. Other initiators include other linear and cyclic compounds containing an amine. Exemplary polyamine initiators include ethylene diamine, neopentyldiamine, 1,6-diaminohexane; bisaminomethyltricyclodecane; bisaminocyclohexane; diethylene triamine; bis-3-aminopropyl methylamine; triethylene tetramine various isomers of toluene diamine; diphenylmethane diamine; N-methyl-1,2-ethanediamine, N-methyl-1,3-propanediamine, N,N-dimethyl-1,3-diaminopropane, N,N-dimethylethanolamine, 3,3'-diamino-N-methyl-dipropylamine, N,N-dimethyldipropylenetriamine and aminopropyl-imidazole. Embodiments encompass a mixture of 1,3-cyclohexanedimethanol and 1,4-cyclohexanedimethanol in a weight ratio from about 60:40 to about 5:95.

In one embodiment the initiators are alkoxylated with ethylene oxide, propylene oxide, or a mixture of ethylene and at least one other alkylene oxide to give an alkoxylated initiator with a molecular weight between 200 and 6000, preferably between 500 and 5000. In one embodiment the initiator has a molecular weight of 550, in another embodiment the molecular weight is 625, and in yet another embodiment the initiator has a molecular weight of 4600.

In one embodiment at least one initiator is a polyether initiator having an equivalent weight of at least 400 or an average at least 9.5 ether groups per active hydrogen group, and such initiators are described in WO 2009/117630.

The ether groups of the polyether initiator may be in poly(alkylene oxide) chains, such as in poly(propylene oxide) or poly(ethylene oxide) or a combination thereof. In one embodiment the ether groups may be in a diblock structure of poly(propylene oxide) capped with poly(ethylene oxide).

In one embodiment the NOBP is a polyol which comprises at least two natural oil moieties separated by a molecular structure having at least about 19 ether groups or separated by a polyether molecular structure having an equivalent weight of at least about 480.

In one embodiment, a NOBP is made with an alkoxylated initiator or combination of alkoxylated initiators having an average equivalent weight of between 400 and 3000 per active hydrogen group. The average equivalent weight can be from a lower limit of 400, 450, 480, 500, 550, 600, 650, 700, 800, 900, 1000, 1200, or 1300 to an upper limit of 1500, 1750, 2000, 2250, 2500, 2750, or 3000 per active hydrogen group.

Thus, in this embodiment, at least two of the natural oil based monomers are separated by a molecular structure having an average molecular weight of between 1250 Daltons and 6000 Daltons. The average molecular weight can be from a lower limit of 1250, 1500, 1750, 2000, 2250, 2500, 2750, or 3000 Daltons to an upper limit of 3000, 3500, 4000, 4500, 5000, 5500, or 6000 Daltons.

To form the polyether initiator, the active hydrogen groups may be reacted with at least one alkylene oxide, such ethylene oxide or propylene oxide or a combination thereof; or a block of propylene oxide followed by a block of ethylene oxide, to form a polyether polyol by means within the skill in the art. The polyether initiator may be used as an initiator for reaction with at least one natural oil based monomer. Alternatively the initiator is reacted by means within the skill in the art to convert one or more hydroxyl groups to alternative active hydrogen groups, such as is propylene oxide.

Thus, in one embodiment the natural oil based polyol may comprise at least two natural oil moieties separated by a molecular structure having at least 19 ether groups or having an equivalent weight of at least 400, preferably both. When the polyether initiator has more than 2 active hydrogen groups reactive with the natural oil or derivative thereof, each natural oil moiety is separated from another by an average of at least 19 ether groups or a structure of molecular weight of at least 400, preferably both.

The functionality of the resulting natural oil based polyols is above 1.5 and generally not higher than 6. In one embodiment the functionality is below 4. The hydroxyl number of the natural oil based polyols may be below 300 mg KOH/g, preferably between 20 and 300, preferably between 20 and 200. In one embodiment, the hydroxyl number is below 100.

The first component also includes at least one chain extender. For purposes of the embodiments of the invention, a chain extender is a material having two isocyanate-reactive groups per molecule and an equivalent weight per isocyanate-reactive group of less than 400, daltons. All individual values of less than 400 daltons are included herein and disclosed herein; for example, the equivalent weight per isocyanate-reactive group can be less than 150, 200, 250, 300, 350, or 400 daltons. Between about 0.5 and about 15 weight % of the first component may include the at least one chain extender. All individual values and subranges between about 0.5 and about 15 weight % are included herein and disclosed herein; for example, the amount can be from a lower limit of about 0.5, 1, 2, 3, 4, 5, 7, 10, or 12 weight % to an upper limit of about 3, 4, 5, 7, 10, 12 or 15 weight %.

Representative chain extenders include ethylene glycol, diethylene glycol, 1,3-propane diol, 1,3- or 1,4-butanediol, dipropylene glycol, 1,2- and 2,3-butylene glycol, 1,6-hexanediol, neopentylglycol, tripropylene glycol, 1,2-ethylhexyldiol, ethylene diamine, 1,4-butylenediamine, 1,6-hexamethylenediamine, 1,5-pentanediol, 1,6-hexanediol, 1,3-cyclohexandiol, 1,4-cyclohexanediol; 1,3-cyclohexane dimethanol, 1,4-cyclohexane dimethanol, N-methylethanolamine, N-methyliso-propylamine, 4-aminocyclohexanol, 1,2-diaminotheane, 1,3-diaminopropane, hexylmethylene diamine, methylene bis(aminocyclohexane), isophorone diamine, 1,3- or 1,4-bis(aminomethyl)cyclohexane, diethylenetriamine, 3,5-diethyltoluene-2,4-diamine and 3,5-diethyltoluene-2,6-diamine, and mixtures or blends thereof. Suitable primary diamines include for example dimethylthiotoluenediamine (DMTDA) such as Ethacure 300 from Albermarle Corporation, diethyltoluenediamine (DETDA) such as Ethacure 100 Ethacure from Albermarle (a mixture of 3,5-diethyltoluene-2,4-diamine and 3,5-diethyltoluene-2,6-diamine), isophorone diamine (IPDA), and dimethylthiotoluenediamine (DMTDA).

The first component further includes at least one filler. The filler materials may be organic or inorganic, and may be in a form of individual, discrete particles. Inorganic filler materials include, for example, metal oxides, metal hydroxides, metal carbonates, metal sulfates, various kinds of clay, silica, alumina, powdered metals, glass microspheres, or void-containing particles. Specific examples of inorganic filler materials include calcium carbonate, barium sulfate, sodium carbonate, magnesium carbonate, magnesium sulfate, barium carbonate, kaolin, carbon, calcium oxide, magnesium oxide, magnesium hydroxide, aluminum oxide, aluminum hydroxide, and titanium dioxide. Inorganic filler materials also include, for example, those having higher aspect ratios than particles, such as talc, mica and wollastonite. Organic filler materials include, for example, latex particles, particles of thermoplastic elas-5 tomers, pulp powders, wood powders, cellulose derivatives, chitin, chitozan powder, powders of highly crystalline, high melting polymers, beads of highly crosslinked polymers, organosilicone powders, and powders or particles of super absorbent polymers, such as polyacrylic acid and the like. 10 Combinations of any of these filler materials may also be used. Between about 5 and about 50 weight % of first component may include the filler. All individual values and subranges between about 5 and about 50 parts per weight are included herein and disclosed herein; for example, the amount can be from a lower limit of about 5, 10, 15, 20, 25, 30, 35 weight % to an upper limit of about 20, 25, 30, 35, 40, 45, or 50 weight %.

The average filler particle sizes may from about 50 nanometers (nm) to about 3000 nm. All individual values and subranges between about 50 nm and about 3000 nm are included herein and disclosed herein; for example, the amount can be from a lower limit of about 50, 60, 70, 80, 90, 100, 200, 250, 300, 400, 500, 600, 750, 900, 1000, 1500, or 2000 nm to an upper limit of about 200, 250, 300, 400, 500, 600, 750, 900, 950, 1000, 1100, 1200, 1300, 1400, 1500, 2000, 2500, or 3000 nm. As used herein, particle sizes refer to the longest distance possible between two points on an individual particle; for example, for perfectly spherical particles, the particle size is equivalent to the spherical particles' diameter.

The at least one filler may include a first filler composition having an average particle size from about 1 nm to about 300 nm and a second filler composition having an average particle size from about 400 nm to about 1500 nm. Embodiments encompass a first filler composition having an average particle size from about 50 nm to about 100 nm and a second filler composition having an average particle size from about 500 nm to about 900 nm.

The first component may optionally include at least one plasticizer. Suitable plasticizers are well-known in the art and abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitriles, siloxane-based plasticizers, tar-based products, thioeters, seed oil or seed oil derivative and combinations thereof. Phtalates include alkylbenzyl phthalate (e.g., alkyl is octyl), dioctyl phthalate, dibutyl phthalate, diisononyl phthalate, and the like. The amount of plasticizer used is that amount sufficient to give the desired rheological properties and disperse the components in the sealant composition while maintaining desired mechanical properties of the final product. Between about 0.5 and about 30 weight % of the first component may include the at least one plasticizer. All individual values and subranges between about 0.5 and about 30 weight % are included herein and disclosed herein; for example, the amount can be from a lower limit of about 0.5, 1, 2, 3, 4, 5, 7, 10, 12, 15, or 20 weight % to an upper limit of about 3, 4, 5, 7, 10, 12, 15, 20, 25, or 30 weight %.

The first component may optionally include at least one thixotrope such as calcinated clay or fumed silica which has been surface modified with polydimethylsiloxane. Between about 0.5 and about 15 weight % of the first component may include the at least one thixotrope. All individual values and subranges between about 0.5 and about 15 weight % are included herein and disclosed herein; for example, the amount can be from a lower limit of about 0.5, 1, 2, 3, 4, 5, 7, 10, or 12 weight % to an upper limit of about 3, 4, 5, 7, 10, 12 or 15 weight %.

The first component is reacted with a second component which includes at least one isocyanate. Suitable isocyanates include a wide variety of organic mono- and polyisocyanates. Suitable monoisocyanates include benzyl isocyanate, toluene isocyanate, phenyl isocyanate and alkyl isocyanates in which the alkyl group contains from 1 to 12 carbon atoms. Suitable polyisocyanates include aromatic, cycloaliphatic and aliphatic isocyanates. Exemplary polyisocyanates include m-phenylene diisocyanate, toluene-2-4-diisocyanate, toluene-2-6-diisocyanate, isophorone diisocyanate, 1,3- and/or 1,4-bis(isocyanatomethyl)cyclohexane (including cis- or trans-isomers of either), hexamethylene-1,6-diisocyanate, tetramethylene-1,4-diisocyanate, cyclohexane-1,4-diisocyanate, hexahydrotoluene diisocyanate, methylene bis(cyclohexaneisocyanate) ($H_{12}MDI$), naphthylene-1,5-diisocyanate, methoxyphenyl-2,4-diisocyanate, diphenylmethane-4, 4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4, 6-triisocyanate and 4,4'-dimethyldiphenylmethane-2,2',5,5'-tetraisocyanate. In some embodiments, the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-methylene diphenyl isocyanate, diphenylmethane-2,4'-diisocyanate and mixtures thereof are generically referred to as MDI, and all may be used. Toluene-2,4-diisocyanate, toluene-2,6-diisocyanate and mixtures thereof are generically referred to as TDI, and all may be used. In one embodiment, a 50 percent 4,4' MDI, 50 percent 2,4' MDI, such as ISONATE 50 OP available from The Dow Chemical Company, is used in combination with a polymeric MDI, such as PAPI 27 available from The Dow Chemical Company.

Derivatives of any of the foregoing isocyanate groups that contain biuret, urea, carbodiimide, allophonate and/or isocyanurate groups may also be used. These derivatives often have increased isocyanate functionalities and are desirably used when a more highly crosslinked product is desired. The first component and the second component may be reacted at isocyanate indexes from 60 to 150. All individual values and subranges between about 60 and about 150 are included herein and disclosed herein; for example, the amount can be from a lower limit of about 60, 70, 80, 90, or 100, to an upper limit of about 90, 100, 125, or 150.

Furthermore, the first component and the second component are reacted in the presence of at least one adhesion promoter. The adhesion promoter may be introduced as a third separate component. Alternatively, the adhesion promoter may be included as part of the first component and/or as part of the second component. The adhesion promoter level in the sealant compositions may in the range of 0.5 weight % to 10 weight % of the total weight of the materials used in the polyurethane sealant system. All individual values and subranges between about 0.5 weight % and about 10 weight % are included herein and disclosed herein; for example, the amount can be from a lower limit of about 0.5, 1, 2, 3, 4, or 5, to an upper limit of about 2, 3, 5, 6, 7, 8, 9, or 10 weight %.

The at least one adhesion promoter encompasses at least the reaction product of at least one secondary aminoalkoxy silane and at least one second isocyanate, such that the reaction product has an average of at least one silane group and at least one isocyanate group per molecule.

The at least one adhesion promoter may be a reaction product of a secondary amino- or mercaptoalkoxy silane and a polyisocyanate, having an average of at least one silane group and at least one isocyanate group per molecule (hereinafter "adduct"), such as for example described in U.S. Pat. No. 5,623,044. Embodiments encompass adducts having at least 1.5 isocyanate groups and at least one silane group per molecule, and adducts having at least two isocyanate groups and at least one silane group per molecule.

The adduct may be prepared by any suitable method, such as, for example, by reacting an secondary amino- or mercapto-alkoxy silane with a polyisocyanate compound. Suitable polyisocyanates for use in preparing the adduct include those described above as suitable for use in the second component. Suitable secondary aminoalkoxy silanes correspond to the following formula:

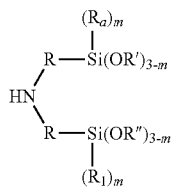

wherein R is a divalent organic group, preferably $C_{1-4}$ alkylene, R', R", $R_1$ and Ra are hydrogen or alkyl, preferably $C_{1-4}$ alkyl, m is an integer from 0 to 2. Examples of such compounds include: N,N-bis[(3-triethoxysilyl)propyl]amine; N,N-bis[(3-tripropoxysilyl)propyl]amine; N-(3-trimethoxysilyl)propyl-3-[N-(3-trimethoxysilyl)-propylamino]propionamide; N-(3-triethoxysilyl)propyl-3-[N-3-triethoxysilyl)-propylamino]propionamide; N-(3-trimethoxysilyl)propyl-3-[N-3-triethoxysilyl)-propylamino]propionamide; 3-trimethoxysilylpropyl 3-[N-(3-trimethoxysilyl)-propylamino]-2-methyl propiorate; 3-triethoxysilylpropyl 3-[N-(3-triethoxysilyl)-propylamino]-2-methyl propionate; 3-trimethoxysilylpropyl 3-[N-(3-tri-30 ethoxysilyl)-propylamino]-2-methyl propionate; and the like.

The silane and the polyisocyanate reactants may be combined so that the ratio of isocyanate groups to secondary amine or groups in the reaction mixture to prepare the adduct is at least about 1.5:1, 2.0:1, or 2.5:1; and is may be less than about 6.0:1, 5.5:1, or 5.0:1. The adduct may be prepared by any suitable method, such as described in U.S. Pat. No. 5,623,044.

In addition to the above described components, the compositions may also include other ingredients such as preservatives, antioxidants, and catalysts.

Catalysts typically used in the two component sealant compositions of this invention include those known to be useful for facilitating polyurethane production. The catalysts include metal and non-metal catalysts. Examples of the metal portion of the metal catalysts useful in the present invention include tin, titanium, zirconium, lead, iron cobalt, antimony, manganese, bismuth and zinc compounds. In one embodiment the tin compounds useful for facilitating crosslinking in the sealant compositions include: tin compounds such as dimethyldineodecanoatetin, dibutyltindilaurate, dibutyltindiacetate, dibutyltindimethoxide, tinoctoate, isobutyltintriceroate, dibutyltinoxide, solubilized dibutyl tin oxide, dibutyltin bis diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, and tinbutyrate, and the like.

The sealant compositions embodied herein may be prepared by procedures well known in the art, e.g., melt blending, extrusion blending, solution blending, dry mixing, etc., in or out of the presence of moisture, to provide a substantially homogeneous mixture. The sealant compositions embodied herein are used in the same manner as known sealants for IG units.

Insulated glass (IG) units are well known, and FIG. 1a of WO 2009/060199 is illustrative. The IG unit is of known and conventional construction, and it includes two panes maintained in a parallel, spaced-apart relationship by one or more spacer bars, thus forming a cavity between the panes. A primary gas sealant is present between each spacer bar and each pane, adjacent to the cavity. A secondary gas sealant is present between each pane and each spacer bar, not adjacent to the cavity. The sealant composition of the embodiments presented above can be either or both the primary and secondary gas sealants although it is typically the secondary sealant. The cavity between the panes is filled with an insulating gas or gases such as air, carbon dioxide, sulfur hexafluoride, nitrogen, argon, krypton, xenon, and the like. A glazing bead is typically positioned between the panes and the window frame. The panes can be fabricated from any of a variety of materials such as glass, e.g., clear float glass, annealed glass, tempered glass, solar glass, tinted glass and low energy glass; acrylic resin; polycarbonate resin; and the like.

The cured sealant compositions embodied herein provides improved gas barrier characteristics and moisture leakage characteristics relative to known and conventional gas sealants. As a result, the cured sealant composition provides for longer in-service performance of insulated glass units of all manner of construction. Furthermore, the sealant compositions embodied herein provides improved weathering properties relative to known and conventional gas sealants. For, example the sealant compositions embodied herein have better resistance to UV light and humidity.

Although the embodiments of the sealant compositions can serve as the primary gas sealant, typically the primary gas sealant comprises any one of a number of polymeric materials known in the art as useful for serving as a primary sealant including, but not limited to, rubber base materials such as polyisobutylene, butyl rubber, polysulfide, EPDM rubber, nitrile rubber, and the like. Other useful materials include, polyisobutylene/polyisoprene copolymers, polyisobutylene polymers, brominated olefin polymers, copolymers of polyisobutylene and para-methylstyrene, copolymers of polyisobutylene and brominated para-methylstyrene, butyl rubber-copolymer of isobutylene and isoprene, ethylene-propylene polymers, polysulfide polymers, polyurethane polymers, styrene butadiene polymers, and the like. In addition, the sealant composition of this invention can be used as the primary gas sealant.

The primary gas sealant member can be fabricated from a material such as polyisobutylene which has very good sealing properties. The glazing bead is a sealant that is sometimes referred to as the glazing bedding and can be provided in the form of a silicone or butyl rubber. Desiccant can be included in the continuous spacer to remove moisture from the insulating gas occupied cavity or space between the panes. Useful desiccants are those that do not adsorb the insulating gas/gases filling the interior of the insulated glass unit.

The following examples are illustrative of certain embodiments of the present invention. All parts and percentages are based on weight except as otherwise indicated.

EXAMPLES

The following examples are provided to illustrate the embodiments of the invention, but are not intended to limit the scope thereof. All parts and percentages are by weight unless otherwise indicated.

Tensile strength and Elongation at break is measured according to ASTM standard test D1708. Elongation at break is measured according to ASTM standard test D1708.

The following materials are used:

Polyol A natural oil based polyol made by combining monol-rich natural oil monomer (1351.76 g) and 1,4-cyclohexanedimethanol (48.02 g). The monol-rich natural oil monomer has an average of 1.0 hydroxyls per fatty acid and is derived from fractionated fatty acids yielding a distribution of about 1 weight percent (wt %) saturated monomer, about 93 wt % mono-hydroxy monomer, about 3 wt % di-hydroxyl monomer, and about 1 wt % cyclic ethers. The monomer distribution is obtained using the method disclosed in co-pending application published as WO 2009/009271. The mixture is heated and held between 70° C. and 90° C. for 30 minutes with stirring and nitrogen stripping in a three neck flask. Stannous octoate (0.88 g) is then added to the mixture and the temperature is increased to 195° C. The mixture is stirred at the reaction temperature of 195° C. with nitrogen stripping for 6 hours and then cooled to room temperature. The resulting polyol is then dispensed in air through the reactor bottom drain valve and stored in a HDPE plastic container.

1,4-Butanediol Available from International Specialty Products.

PALATINOL-N A phthalate plasticizer available from BASF SE.

SUPER PFLEX 200 pcc A precipitated calcium carbonate filler (average particle size of 0.7 microns) which is surface treated with stearic acid for a surface treatment level of 2%, available from Minerals Technologies Inc.

ULTRA PFLEX A surface treated precipitated calcium carbonate filler (average particle size of 0.07 microns) available from Minerals Technologies Inc.

CAB-O-SIL TS-720 A medium surface area fumed silica which has been surface modified with polydimethylsiloxane, available from Cabot Corporation.

Isocyanatosilane An isocyanatosilane adduct made according to the method of Example 1(B) of U.S. Pat. No. 5,623,044. The isocyanatosilane adduct is prepared by adding 485 g of Desmodur N-100 (2.59 equivalents) (available from Bayer MaterialScience, a solvent-free aliphatic polyisocyanate resin based on hexamethylenediisocyanate), and 225 g of alkyl phthalate plasticizer Palatinol N (available from BASF SE) to a resin kettle equipped with a mechanical agitator, a thermometer, a $N_2$ inlet adapter and an addition funnel. The mixture is thoroughly mixed and purged $N_2$ blanket. About 300 g of (N,N-bis[3-trimethoxysilyl)-propyl]amine (0.88 equivalents) (available from Momentive Performance Materials Inc.) is slowly added to the mixture. The adduct has an isocyanate content of 7.0 percent SILQUEST A-187 Gamma glycidoxypropyltrimethoxysilane available from Momentive Performance Materials Inc.

SANTICIZER 278 A plasticizer of a high molecular weight Benzyl Phthalate, available from Ferro Corporation.

ISONATE* 143L A polycarbodiimide-modified diphenylmethane diisocyanate, available from The Dow Chemical Company.

DABCO T-12 A dibutyl tin dilaurate catalyst available from Air Products.

FOMREZ UL-28 A dimethyldineodecanoatetin catalyst available Momentive Performance Materials Inc.

*ISONATE is a trademark of the Dow Chemical Company.

Examples E1-E3 and Comparative Example CE1

A "Polyol side" is prepared by combining Polyol, 1,4-Butanediol, PALATINOL, SUPER P-FLEX, ULTRA P-FLEX, CAB-O-SIL TS-720, and DABCO T-12 in the amounts as indicated in Table 1. An "Isocyanate side" is prepared by combing ISONATE* 143L and adhesion promoter (either SILQUEST A-187 (comparative example CE1) or Isocyanatosilane (Examples E1-E3)) in the amounts as indicated in Table 1.

TABLE 1

|  | CE1 | E1 | E2 | E3 |
|---|---|---|---|---|
| Polyol | 100 | 100 | 100 | 100 |
| 1,4-Butanediol | 2.2 | 2.2 | 2.2 | 2.2 |
| PALATINOL-N | 30 | 30 | 30 | 30 |
| SUPER P-FLEX | 85 | 85 | 85 | 85 |
| ULTRA P-FLEX | 45 | 45 | 45 | 45 |
| CAB-O-SIL TS-720 | 3 | 3 | 3 | 3 |
| SILQUEST A-187 | 2 |  |  |  |
| Isocyanatosilane |  | 1 | 2 | 4 |
| ISONATE* 143L | 18.4 | 18.4 | 18.4 | 18.4 |
| DABCO T-12 | 0.12 | 0.12 | 0.12 | 0.12 |

The Isocyanate and Polyol sides are then combined and the mixture is mixed for 10 seconds at 800 RPM and then for 15 seconds at 2350 RPM. Samples are prepared for lap shear measurements by applying a bead of uncured sealant approximately 6.3 mm wide by 8 mm high along the width of a glass plate (1"×6"×¼"). A stainless steel substrate (1"×4"×1/32") is immediately placed on the sealant such that 2" inches of the glass plate and the stainless steel substrate overlap. The sample is allowed to cure at 23° C. and 50 percent relative humidity for 7 days. The sample is then separated by pulling in a plane parallel to the bead with an Instron machine at a rate of 1 inch/minute (2.5 cm/min).

For comparative example CE1 a lap shear strength of 133.5 psi is obtained. For example E1, which has half the amount (by weight) of adhesion promoter than CE1, a lap shear strength of 141.5 is obtained. For example E2-E3 substrate (glass) failures occur before lap shear strength determination is obtained. The substrate failures occur at about 172 psi.

Example E4

A "Polyol side" is prepared by first combining Polyol (30 g), 1,4-Butanediol (1.05 g), and Isocyanatosilane (0.6 g) and mixing for 15 seconds at 800 RPM and then for 45 seconds at 2350 RPM. ISONATE* 143L (7.95 g) is added to the Polyol side and the mixture is mixed for 10 seconds at 800 RPM and then for 15 seconds at 2350 RPM. Then, FOMREZ UL-28 (50 ppm) is added and the mixture is mixed again for 10 seconds at 800 RPM and then for 15 second at 2350 RPM. Mixture is then placed into a 4"×4" mold with a sample thickness of 50 mil. The sample is cured in a press at 30000 psi and 50° C. for 30 minutes. Example E4 has a tensile strength 407 psi, and an elongation at break of 312%.

Example E5

A "Polyol side" is prepared by first combining Polyol (30 g), 1,4-Butanediol (1.05 g), Isocyanatosilane (0.6 g), and SANTICIZER 278, and mixing for 15 second at 800 RPM and then for 45 seconds at 2350 RPM. Then, SUPER P-FLEX (25.5 g), ULTRA P-FLEX (12 g) is added and mixed for 15 seconds at 800 RPM and then for 45 seconds at 2350 RPM. Then, CAB-O-SIL TS-720 (0.9 g) is added and mixed for 15 seconds at 800 RPM and then for 45 seconds at 2350 RPM. ISONATE* 143L (7.95 g) is added to the Polyol side and the mixture is mixed for 10 seconds at 800 RPM and then for 15 seconds at 2350 RPM. Then, FOMREZ UL-28 (50 ppm) is added and the mixture is mixed again for 10 seconds at 800 RPM and then for 15 second at 2350 RPM. Mixture is then placed into a 4"×4" mold and a sample thickness of 50 mil. The sample is cured in a press at 30000 psi and 50° C. for 30 minutes. Example E5 has a tensile strength 643 psi, and an elongation at break of 429%.

While the foregoing is directed to embodiments of the present invention, other and further embodiments of the invention may be devised without departing from the basic scope thereof, and the scope thereof is determined by the claims that follow.

The invention claimed is:

1. A method of producing an insulated unit, the method comprising:
    forming a first component that includes:
        at least one hydrophobic polyol derived from a fatty acid alkyl ester and having an average functionality from about 2 to about 6 and a hydroxyl number below 300 mg KOH/g;
        at least one chain extender having two isocyanate-reactive groups per molecule and an equivalent weight per isocyanate-reactive group of less than 400; and
        at least one filler, wherein the at least one filler is at least one of barium sulfate ($BaSO_4$), aluminum oxide ($Al_2O_3$), aluminum hydroxide ($Al(OH)_3$), magnesium hydroxide ($Mg(OH)_2$) calcium carbonate ($CaCO_3$), mica, and talc;
    providing a second component that includes at least one first isocyanate;
    contacting the first component with at least the second component in the presence of at least one adhesion promoter to form a reaction mixture, the at least one adhesion promoter including the reaction product of at least one secondary aminoalkoxy silane and at least one second isocyanate, and the reaction product having an average of at least one silane group and at least one isocyanate group per molecule; and
    applying at least the reaction mixture, between at least portions of a first surface and a second surface included in the insulated unit.

2. The method of claim 1, wherein the first component further comprises at least one plasticizer.

3. The method of claim 1, wherein the first component further comprises at least one thixotrope and the at least one thixotrope is at least one of fumed silica and calcinated clay.

4. The method of claim 3, wherein the first component further comprises at least one catalyst.

5. The method of claim 1, wherein at least one of the first surface and the second surface comprises a glass surface.

6. The method of claim 1, wherein the first surface and the second surface comprise glass.

7. The method of claim 1, wherein the at least one secondary aminoalkoxy silane corresponds to the following formula:

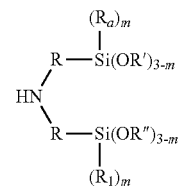

wherein
    R is independently in each occurrence a divalent organic group;
    R', R", $R_1$ and $R_a$ are independently in each occurrence hydrogen or alkyl; and
    m is an integer of from about 0 to about 2.

8. The method of claim 7, wherein R is a straight 3 carbon alkyl group, m is 0, and R' and R" are methyl groups.

9. The method of claim 1, wherein the second component comprises a polycarbodiimide-modified diphenylmethane diisocyanate.

10. The method of claim 1, wherein the second component comprises an aliphatic polyisocyanate resin based on hexamethylenediisocyanate.

11. The method of claim 1, wherein the at least one hydrophobic polyol derived from a fatty acid alkyl ester is derived from a composition comprising at least 75 weight percent mono-hydroxy functional fatty acid alkyl ester.

12. The method of claim 11, wherein the composition comprising at least 75 weight percent mono-hydroxy functional fatty acid alkyl ester is reacted with 1,4-cyclohexanedimethanol.

13. The method of claim 11, wherein the at least one filler comprises a first filler composition having an average particle size from about 1 nm to about 300 nm and a second filler composition having an average particle size from about 400 nm to about 1500 nm.

14. The method of claim 1, wherein:
    an isocyanate index of the second component relative to the first component is from 60 to 150, and
    the at least one adhesion promoter is provided in an amount from 0.5 wt % to 10 wt %, based on the total weight of the total weight of the first component, the second component, and the at least one adhesion promoter.

15. An insulated unit, comprising:
    a first surface;

a structural seal disposed on at least portions of the first surface, wherein the structural seal comprises the reaction product of at least:
(1) a first component that includes:
at least one hydrophobic polyol derived from a fatty acid alkyl ester and having an average functionality from about 2 to about 6 and a hydroxyl number below 300 mg KOH/g;
at least one chain extender having two isocyanate-reactive groups per molecule and an equivalent weight per isocyanate-reactive group of less than 400; and
at least one filler, wherein the at least one filler is at least one of barium sulfate ($BaSO_4$), aluminum oxide ($Al_2O_3$), aluminum hydroxide ($Al(OH)_3$), magnesium hydroxide ($Mg(OH)_2$) calcium carbonate ($CaCO_3$), mica, and talc;
(2) a second component that includes at least one first isocyanate; and
(3) at least one adhesion promoter, such that the first component is contacted with the second component in the presence of the at least one adhesion promoter to form a reaction mixture, the at least one adhesion promoter including the reaction product of at least one secondary aminoalkoxy silane and at least one second isocyanate, and the reaction product having an average of at least one silane group and at least one isocyanate group per molecule; and
a second surface disposed on the structural seal.

16. The insulated unit of claim 15, wherein at least one of the first surface and the second surface comprises a glass surface.

17. The insulated unit of claim 15, wherein the at least one secondary aminoalkoxy silane corresponds to the following formula:

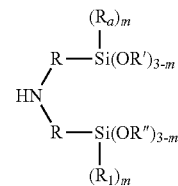

wherein
R is independently in each occurrence a divalent organic group;
R', R", $R_1$ and $R_a$ are independently in each occurrence hydrogen or alkyl; and
m is an integer of from about 0 to about 2.

18. The insulated unit of claim 17, wherein R is a straight 3 carbon alkyl group, m is 0, and R' and R" are methyl groups.

19. The insulated unit of claim 11, wherein the at least one hydrophobic polyol derived from a fatty acid alkyl ester is derived from a composition comprising at least 75 weight percent mono-hydroxy functional fatty acid alkyl ester.

20. The insulated unit of claim 19, wherein the composition comprising at least 75 weight percent mono-hydroxy functional fatty acid alkyl ester is reacted with 1,4-cyclohexanedimethanol.

* * * * *